US012442896B2

(12) United States Patent
Buerkle et al.

(10) Patent No.: US 12,442,896 B2
(45) Date of Patent: Oct. 14, 2025

(54) HIERARCHICAL PERCEPTION MONITOR FOR VEHICLE SAFETY

(71) Applicant: Intel Corporation, Santa Clara, CA (US)

(72) Inventors: Cornelius Buerkle, Karlsruhe (DE); Fabian Oboril, Karlsruhe (DE)

(73) Assignee: REALSENSE LTD., Tel Aviv (IL)

( * ) Notice: Subject to any disclaimer, the term of this patent is extended or adjusted under 35 U.S.C. 154(b) by 291 days.

(21) Appl. No.: 17/956,871

(22) Filed: Sep. 30, 2022

(65) Prior Publication Data

US 2023/0036324 A1 Feb. 2, 2023

Related U.S. Application Data

(60) Provisional application No. 63/313,284, filed on Feb. 24, 2022.

(51) Int. Cl.
G01S 7/48 (2006.01)
G01S 17/42 (2006.01)
G01S 17/86 (2020.01)
G06T 7/11 (2017.01)
G06T 7/521 (2017.01)

(52) U.S. Cl.
CPC .......... G01S 7/4808 (2013.01); G01S 7/4802 (2013.01); G01S 17/42 (2013.01); G01S 17/86 (2020.01); G06T 7/11 (2017.01); G06T 7/521 (2017.01); *G06T 2207/10028* (2013.01); *G06T 2207/20016* (2013.01); *G06T 2207/20076* (2013.01); *G06T 2207/30261* (2013.01)

(58) Field of Classification Search
CPC ...... G01S 7/4808; G01S 7/4802; G01S 17/42; G01S 17/86; G01S 17/89; G01S 17/931; G06T 2207/20016; G06T 7/11; G06T 7/521; G06T 2207/10028; G06T 2207/20076; G06T 2207/30261; G06V 20/58

See application file for complete search history.

(56) References Cited

U.S. PATENT DOCUMENTS

| 8,825,260 B1* | 9/2014 | Silver ................... G01S 13/931 342/159 |
| 2020/0064137 A1* | 2/2020 | Li ........................... G06F 16/29 |
| 2021/0286068 A1* | 9/2021 | Kumar .................... G01S 13/87 |
| 2022/0058834 A1* | 2/2022 | Iguchi .................. H04N 19/597 |
| 2022/0169381 A1* | 6/2022 | Alrasheed ............ G05D 1/0094 |

* cited by examiner

*Primary Examiner* — Manuel A Rivera Vargas
(74) *Attorney, Agent, or Firm* — S. J. INTELLECTUAL PROPERTY LTD.

(57) ABSTRACT

Disclosed herein is a device for filtering a point cloud. The device may include processor configured to receive a plurality of sensed points representing distance measurements to points in an area around an entity. The processor may also be configured to determine, for each sensed point of the plurality of sensed points, one or more probabilities that the sensed point is associated with an obstacle in the area around the entity, wherein each probability of the one or more probabilities is based on a corresponding filter of one or more filters. The processor may also be configured to generate a filtered point cloud from the plurality of sensed points based on, for each sensed point, a hierarchical combination of the one or more probabilities.

19 Claims, 6 Drawing Sheets

HIERARCHICAL PERCEPTION MONITOR FOR VEHICLE SAFETY

CROSS-REFERENCE TO RELATED APPLICATION(S)

This application is a non-provisional application that claims priority to U.S. provisional patent application No. 63/313,284 filed on Feb. 24, 2022, the entirety of which is incorporated herein by reference.

TECHNICAL FIELD

The disclosure relates generally to vehicle safety systems, and in particular, to systems, devices, and methods for identifying obstacles that may be within the proximity of a vehicle.

BACKGROUND

Our transportation world is rapidly transforming, induced by an ever increasing level of vehicle autonomy. However, for fully automated vehicles to be accepted and licensed for widespread public use, it is necessary to assure safety of the entire system, which is still a challenge. This is especially true for artificial intelligence (AI)-based perception systems that have to handle a diverse set of environmental conditions and road users, and at the same time should robustly detect all safety relevant objects (i.e., no detection misses should occur). Nevertheless, limited training and validation data may make it for vehicle suppliers to prove that their vehicle safety systems provide truly fault-free operation in actual driving conditions, given that perception systems might be exposed to unknown objects, conditions, constellations, and situations on public roads that were not yet part of the training and validation data.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
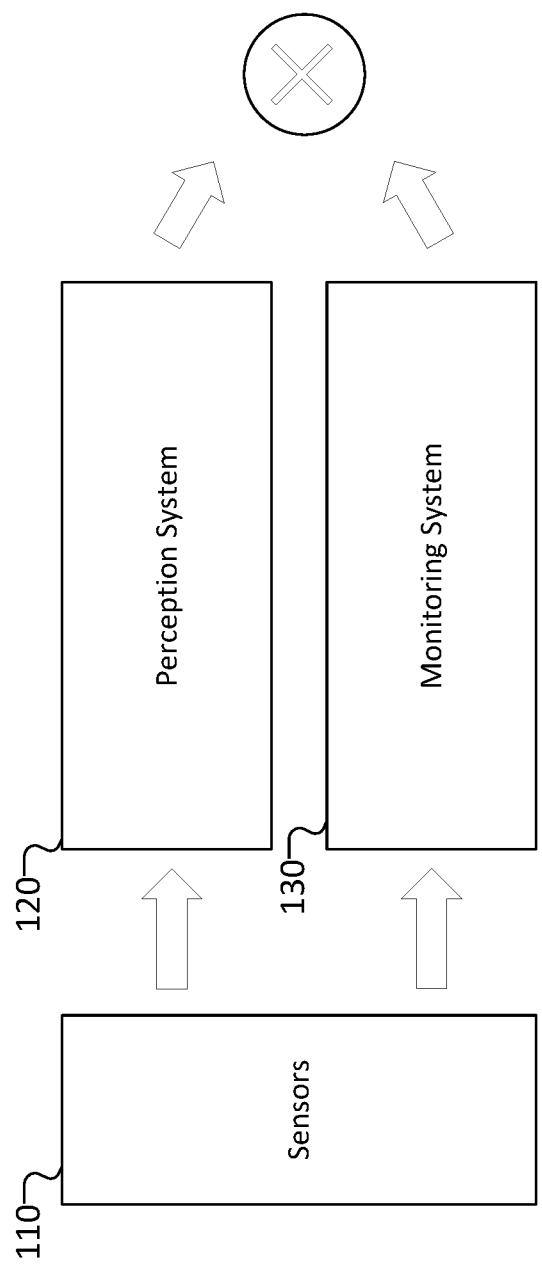
FIG. 1 shows an exemplary two-layer architecture that may be used by a vehicle safety system that may include a hierarchical monitoring system.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of with regard to a group of elements may be used herein to mean at least one element from the group consisting of the elements. For example, the phrase "at least one of with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object or entity. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, or a rocket, among others.

The development of Automated Vehicles (AVs) has made great progress over the last years. As a result, more and more prototypes are tested on public roads and the first robotaxi services have been launched. Despite this success, there are still many open challenges demanding attention to allow mass deployment, in particular with respect to safety assurance under all possible conditions. In this regard, a special focus has to be put on the perception systems. Given that perception systems need to detect all safety-relevant objects under a diverse set of environmental conditions with numerous types of road users, perception systems are being continuously improved to be more robust. First, even though decision making aspects of an Automated Driving System (ADS), for which an Institute of Electrical and Electronics Engineers (IEEE) standard is about to be published, namely, IEEE P2846: A Formal Model for.

Safety Considerations in Automated Vehicle Decision Making, may exist, comprehensive safety concepts for perception systems are still missing.

Second, any perception error, for example a not-detected object, may propagate through the AV processing pipeline and result in a dangerous driving behavior, even if safety concepts for the decision making are in place. In addition, despite the great progress in the past years on AI-based object detection, it is still impossible to prove that these systems robustly detect all objects under all possible environmental conditions (night, rain, snow, fog, highway, urban, etc.). In particular, generalization and robust detection of rare/unknown objects (e.g., objects that maybe not be covered in a robust set of training data) remains an open challenge. Consequently, verifiability remains lacking in conventional AV perception safety systems. In addition, AV perception safety systems may need to be computationally lightweight so as to be able to run on safety-certified hardware, which is typically less powerful. To achieve this goal, it is often of an advantage to build a monitor architecture that only verifies the correctness of the results of the primary perception system, instead of developing means to assure safety of the primary perception system.

FIG. 1 shows the basic concept of a primary perception system along side a monitoring system, where sensors 110 may feed information into a perception system 120 as well as into a monitoring system 130. The monitoring system 130 may be used to verify and/or improve the results from the perception system 120. Using the monitoring system 130 is similar to verifying that a result of a complex mathematical equation is correct, which is usually simpler than deriving the result itself (e.g., the monitoring system 130 may be simpler than the perception system 120). Conventional monitoring systems often use Light Detection and Ranging (LiDAR) sensor data to create a dynamic occupancy grid with optional plausibility checking. While such monitoring may be able to detect and correct detection misses in a primary perception system, such monitoring systems remain relatively computationally intensive. In addition, noise in sensor data (e.g., noise in a LiDAR sensor system) makes it difficult to identify and exclude certain types of noise (e.g. points related to the road surface, etc., rather than an object that poses a safety risk to the vehicle) without negatively impacting the safety of the overall system.

The improved hierarchical monitoring system discussed below may accurately validate the object list created by a primary perception system, reliably detect detection misses of the primary system, and provide for a very low false alarm (e.g., false positives) rate, thereby improving the safety of the overall system.

Figure 2:
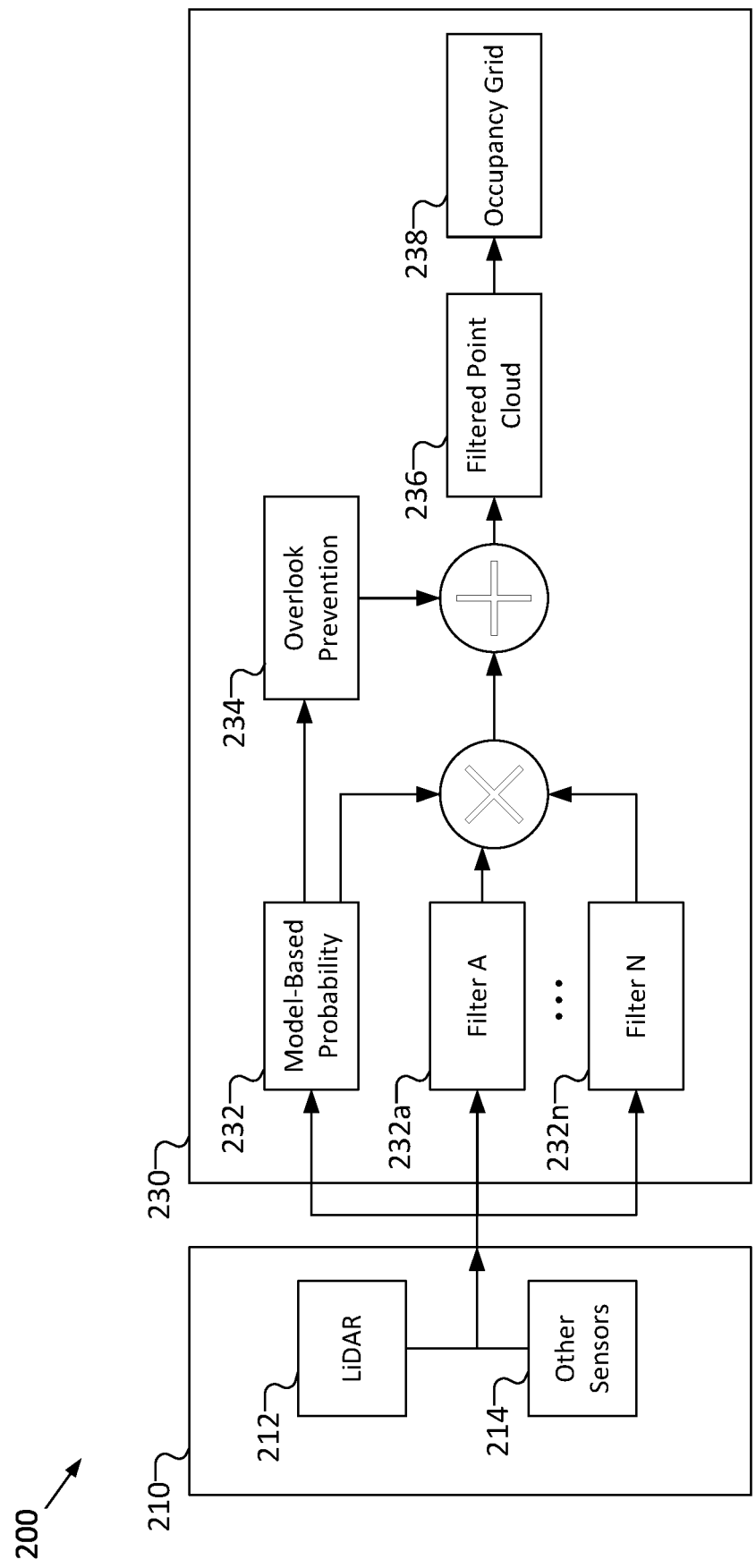
FIG. 2 shows an exemplary block diagram of an exemplary hierarchical monitoring system for generating a filtered point cloud and occupancy grid.

One example of the improved hierarchical monitoring system is illustrated in FIG. 2. The hierarchical monitoring system 200 may use a hierarchical filter concept, built around a model-based height confidence filter, which may ensure that likely safety-relevant objects are detected and that data that belongs to safety-nonrelevant objects (e.g., the road surface) is ignored. Additional filters may be added to evaluate ambiguous detections. After filtering, the hierarchical monitoring system 200 may then convert the filtered, sparse point cloud into an occupancy grid. Hierarchical monitoring system 200 may achieve a low false negative rate ($<0:2\%$) and may also maintain a low false positive rate ($<2\%$).

Using a hierarchical system, such as hierarchical monitoring system 200, to filter sensor data may be important because not all objects in the environment surrounding an AV may necessarily be safety relevant. For example, objects that are far away from the ego vehicle or objects that are moving with a high positive velocity delta with respect to ego vehicle may be considered not safety relevant because a collision with such an object may not possible in near future. Consequently, it may be possible to define a safety relevant zone around the ego vehicle at distance which encompasses the safety-relevant objects. In addition, if there are multiple objects in a designated area (e.g., a lane), only the closest object of each designated area (e.g., lane) may have a direct impact on the AV and therefore safety relevant. Thus, a monitoring system may be designed to detect only the closest object within each designated area (e.g., lane) that is within the safety relevant region.

The disclosed hierarchical system, such as hierarchical monitoring system 200, may be used in conjunction with a perception system, such as perception system 120 depicted in FIG. 1. In other words, such a hierarchical monitoring system may be used as the monitoring system (e.g., monitoring system 130) component that operates alongside an existing (e.g., AI-based) primary perception system. The combination of perception system and monitor may be robust enough such that the safety system does not overlook a safety-relevant object. As such, the focus of such a monitor may be to identify if there are safety-relevant objects in the environment that have been not detected (e.g., by the primary perception system). To achieve this, the monitoring system may detect the presence of all objects in the safety-relevant region, without necessarily needing to make accurate determinations of dimensions of or a bounding-box for the detected objects. In addition, another focus of such a monitoring system may be a low false alarm rate.

As should be appreciated, such a monitoring system may use sensor data that has been collected about, among other information, the environment around the vehicle. Although the discussion that follows focuses primarily on sensor information from a LiDAR sensor, any type of sensor information that provides or may be converted into a set of data representing distance measurements to various points (e.g., a point cloud or "PCL") may be used, and the terms point cloud and LiDAR should not be understood as limiting the type of sensor. In addition, the discussion that follows assumes that the safety relevant objects are "visible" from the sensor data (e.g., all safety-relevant objects are represented in the collected sensor data). Although not specifically discussed herein, it should be appreciated that occlusions within sensor data may be filled using conventional techniques that account for occlusions.

In general, monitoring systems may work in conjunction the primary perception system by receiving an object list from the primary perception system and verifying the object list using an occupancy grid. The fundamental principle of such a verification is that the object position and bounding box information received from the primary may be converted into a spatial occupancy probability. Next, the monitoring system (e.g., a secondary perception system) may then correlate this spatial occupancy probability with an occupancy grid generated by the secondary perception system. Assuming this secondary occupancy information is correct, errors in the primary object information can be identified by calculating the conflict of the two different spatial occupancy values. However, conventional monitoring systems may not properly account for false negatives in the primary perception system (e.g., failing to detect items that were missed by the primary perception system) or may not create false positives (e.g., including safety-irrelevant items). Given that sensor data often includes data about safety-irrelevant objects, too many false positives may reduce the availability of the safety system. For example, if LiDAR sensor data is used for the secondary perception system, the point cloud may likely include drivable space (e.g., the drivable road in front of the ego vehicle may be scanned by the LiDAR or other sensors and may thus be included in the sensor data). If the point cloud includes drivable space, the secondary monitoring system may incorrectly flag it as a safety-relevant object for inclusion in the occupancy grid.

In the hierarchical monitoring system disclosed herein, it may address both of these problems by providing two features. First, the hierarchical monitoring system may ensure that all safety-relevant objects (e.g., obstacles) have been included in the occupancy grid (e.g., adding items that were missed by the primary system so that the safety systems may react in a safe manner). Second, the hierarchical monitoring system may avoid including safety-irrelevant objects in the occupancy list (e.g., the system should ensure that free space (e.g., traversable space) is not marked as being occupied). The hierarchical monitoring system disclosed herein may be able to use LiDAR sensor data as an input (as noted earlier, it is beneficial if the sensor data includes the full set of potentially relevant objects, which is typically represented within LiDAR data) to detect all safety relevant objects that may have been missed by the primary perception system while also having a low false-alarm rate. The hierarchical monitoring system disclosed herein may also be robust enough to accurately handle varying road surfaces (e.g., inclines, small bumps, etc.) and noise in the sensor data (e.g., LiDAR noise levels).

To achieve these benefits, the hierarchical monitoring system disclosed herein may use a hierarchical system to process and filter the point cloud data (e.g., the LiDAR point cloud). An example of such a hierarchical monitoring system is shown in FIG. 2. Hierarchical monitoring system 200 may receive sensor data 210 from one or more sensors (e.g., LiDAR 212 and/or other sensors 214). Hierarchical monitoring system 200 may also include a monitoring system 230 to analyze and filter the sensor data 210 into a filtered point cloud 236 and to estimate an occupancy grid 238 from the filtered point cloud 236. To generate the filtered point cloud 236, the hierarchical monitoring system 200 may include a model-based probability filter 232 for estimating the probability that the sensed point is associated with an obstacle in the area around the vehicle. This probability may be further refined using any number of filters (e.g., filters $232a \ldots 232n$), the results of which may be aggregated together. The hierarchical monitoring system 200 may also use an overlook prevention module 234 to ensure that no points associated with safety-relevant obstacles are removed from the point cloud by the filtering process.

Each of the filters (e.g., the model-based probability filter 232 and filters $232a \ldots 232n$) may determine for each point within the point cloud, a probability that the point is a measurement of a safety-relevant obstacle or object. The filters may make use of any sensor data, including a point cloud of data representing distance measurements to various points (e.g., from a LiDAR sensor), but the filters may utilize other types of sensors and take into account other sensor-related information. By aggregating these probabilities (e.g., from each filter) the hierarchical monitoring system 200 may provide a robust overall decision for each point, a decision as to whether it belongs to a safety-relevant obstacle or if it is associated with traversable space (e.g., free space or space that the AV can safely drive over, under, or through).

This allows filtering of irrelevant points and creation of a filtered point cloud 236, from which the hierarchical monitoring system 200 may then create an occupancy grid 238.

To avoid impairing the safety of the overall system, the filtering of points may safeguard against erroneous deletion of points that in fact belong to a safety-relevant object. At the same time, however, irrelevant points should be filtered out. Such a balance may be hard to strike, especially where the information obtained from the sensor data is ambiguous, and it is not immediately clear to which category a point belongs. To ensure that visible objects within the point cloud are not missed by the perception system, the hierarchical monitoring system 200 may use an overlook prevention module 234. This module may assure that each point that has a high probability of belonging to a relevant object is included in the filtered point cloud 236. To handle ambiguous detection points and reduce the chance of false alarms, the hierarchical monitoring system 200 may use additional filters to specifically evaluate these ambiguous points. In other words, the additional filters may be designed so that the overlook prevention module 234 never removes points and instead may only flag additional points as relevant that should be included in the filtered point cloud 236. As a result, the hierarchical monitoring system 200's combination of the other filters may increase the accuracy and reliability in regions where the data for a given point is ambiguous.

As shown in FIG. 2, one component of hierarchical monitoring system 200 may be a model-based probability filter 232, which may use model knowledge to determine the probability for each point in the point cloud of belonging to a relevant object. For example, the model-based probability filter 232 may uses height and depth information for filtering. The model may also categorize each measured point (e.g., any point cloud datapoint that may represent any surface or object in the surrounding of the vehicle) into one of two categories: traversable or an obstacle. A traversable point is one associated with objects and surfaces that a vehicle may traverse (e.g., drive over, under, or through) without a safety concern (e.g., no harm to the vehicle or the object). Examples of traversable points may be points associated with road surfaces, speed bumps, pot holes, etc. on the low end, and bridge underpasses, branches of trees, overhead road signs on the high end. Obstacle points may be points associated with any other (non-traversable) object in the environment (e.g., a car, a wall, a person, etc.). Obstacles are objects that the vehicle cannot bypass without causing a collision or safety concern.

One purpose of the model-based probability filter 232 is to reliably identify sensor data (e.g., measurement points) that should be categorized as belonging to an obstacle. The model-based probability filter 232 may apply knowledge from a model to determine the probability that a particular piece of sensor data should be categorized as belonging to an obstacle. For example, model-based probability filter 232 may categorize an object or surface point as traversable if it belongs to the road surface (e.g., the point is located at a height/depth such that the vehicle may drive over it) or if it belongs to the ceiling (e.g., the point is located at a height/depth such that the vehicle may drive under it). If the point does not fall within these two ranges, the model-based probability filter 232 may determine that point is associated with an obstacle. Often, however, it may not be easy to determine with certainty whether a point should be categorized as traversable. For example, a road surface might not be flat, the road might have an incline or there might be small obstacles on the street that could be dangerous to the vehicle. Nevertheless, the model-based probability filter 232 may identify which points within the environment have a high probability of being a point associated with an obstacle (Po). Briefly explained, points with a high probability of being associated with a safety-relevant obstacle may be points that are located at a significant height over the road surface or show a significant height incline (e.g., as compared to nearby points).

In order to determine Po, the model-based probability filter 232 may determine height differences between adjacent measurement points. Unfortunately, this is not directly possible for an (unsorted) LiDAR point cloud, as neighbor relations among points cannot be inferred. To overcome this issue, the model-based probability filter 232 may convert point cloud data into a height and depth image, where each pixel of the image corresponds to exactly one measurement point (e.g., a LiDAR measurement point of the point cloud). For LiDAR data, the overall height of the image may be equivalent to the number of vertical LiDAR scans (layers) within the LiDAR data, and the overall image width may be given by the horizontal resolution of each LiDAR scan. Using this image data, the model-based probability filter 232 may calculate the azimuth and vertical angle from the point positions (e.g., within the sensor coordinate system), as follows:

$$\alpha = \arctan(y, x) \quad (1)$$

$$\delta = \arctan(z, \sqrt{(x^2 + y^2)}) \quad (2)$$

Given these values for α and β, it is possible to assign each point to exactly one pixel and therefore a lossless conversion of the point cloud is maintained. Unfortunately, noise on point positions and the movement of the vehicle during the duration of the sensor scan may introduce errors. These errors may cause several points to be associated with one pixel. For these conflicts, where one pixel is associated with multiple points, the model-based probability filter 232 may keep for this pixel the point value of the multiple points that has the lowest distance and discard point values with larger distances. Once the pixel position is calculated the model-based probability filter 232 may construct two images, a height and depth image, where sensor data for the environment (e.g., LiDAR data) may be been converted into a height image, where each pixel represents a height of the measurement point, and/or a depth image, where each pixel represents a distance (depth) to the measurement point. For depth and height values, the model-based probability filter 232 may use the vehicle coordinate system as reference, as this may allow easier processing of the values in the other processing steps.

Figure 3:
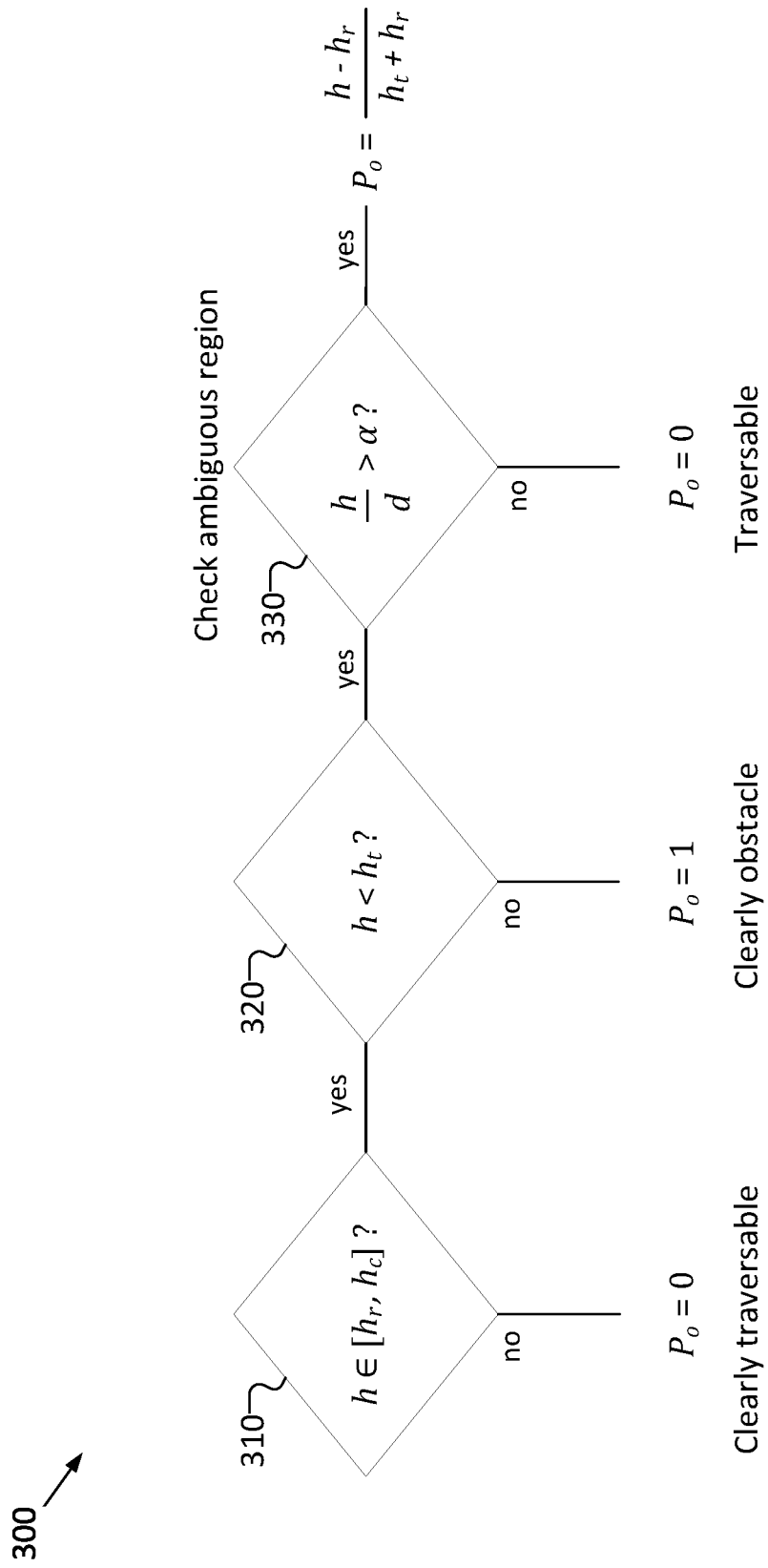
FIG. 3 depicts an exemplary flow chart of an exemplary model-based filter for determining a probability that a sensor point is associated with an obstacle.

Once the model-based probability filter 232 has constructed the datasets for the depth and height images, the model-based probability filter 232 may use this information to calculate an obstacle probability (Po). FIG. 3 shows an example of how the model-based probability filter 232 may calculate $P_0$, where h is the current height of the point, d is the distance, a is an incline threshold value, $h_r$ and $h_c$ are the road surface and ceiling height, respectively, and $h_t$ is a height threshold value.

Generally, $P_o$ may be a low probability value if the point is either part of the road surface or the ceiling. $P_o$ may increase the further the point is away from road surface or below the ceiling. Hence, the model-based probability filter 232 may first estimate the road surface height from the point cloud data, which may be achieved by using the height image. The height image may be constructed such that the lowest data scan (e.g., lowest LiDAR beam) correlates with the lowest row in the height image. Thus, the model-based probability filter 232 may determine that the road surface starts in the lowest rows of the image and the height value of the points at or near the road surface should be at or close to zero. By traversing from the bottom rows to the top rows of the image, the model-based probability filter 232 may determine the incline between adjacent measurement points. Generally, measurements with a low incline are likely to be associated with road surface measurements, even though the exact threshold incline value (e.g., that which may distinguish which points belong to the road surface) may depend on the slope of the road and pitch of the vehicle. Though the model-based probability filter 232 may use any threshold incline value, a maximum incline of α=5 may provide robust results.

Figure 4:
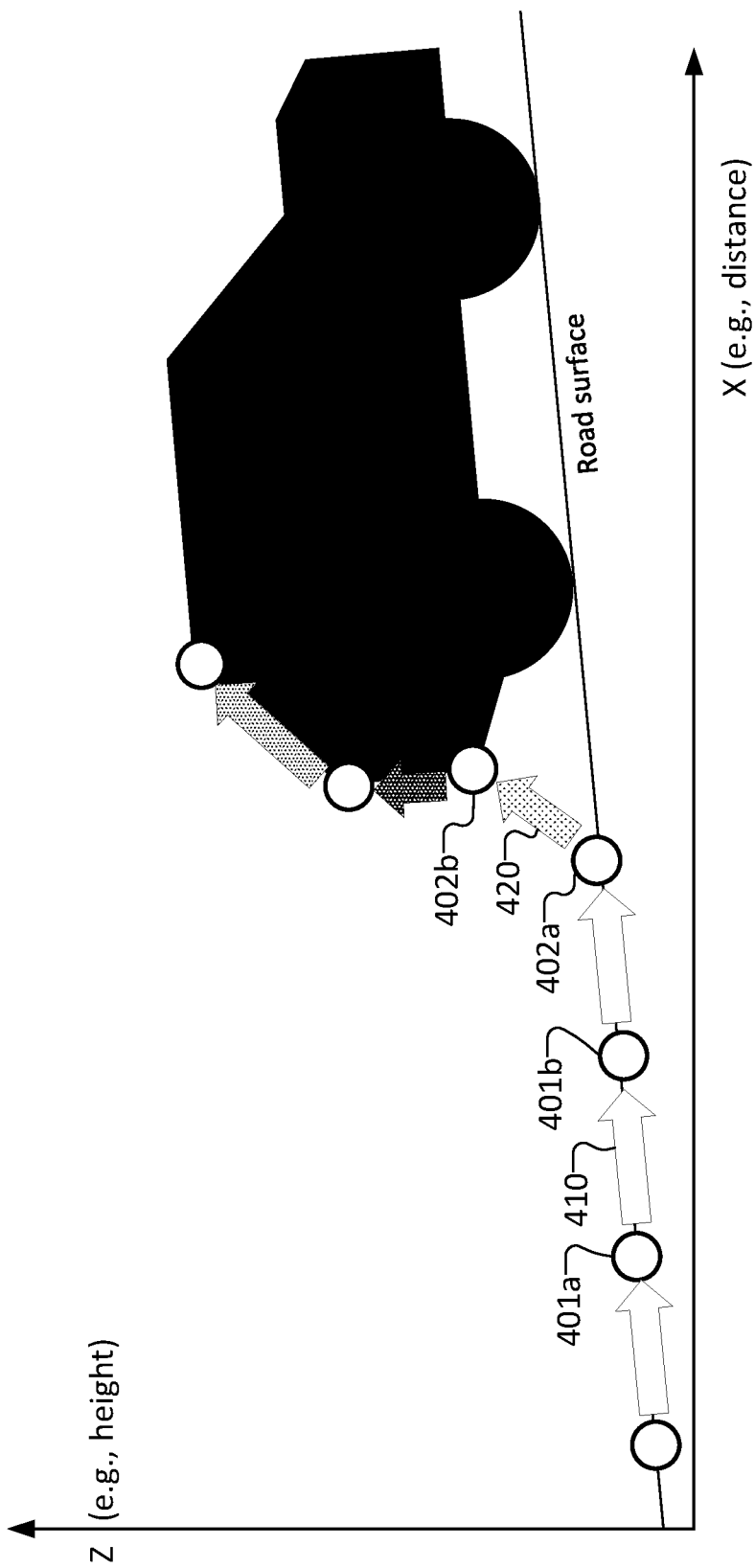
FIG. 4 shows an exemplary set of measurement points and their change in height that may be used as part of a filter in an exemplary hierarchical monitoring system.

An example of such inclines are shown in FIG. 4, where the measurement points are represented by circles and the incline between two adjacent points is shown by the arrows. When there is a large incline between adjacent points, it may suggest a safety-relevant obstacle. When there is a small incline between adjacent points, this may suggest traversable space. For example, between points 401a and 401b, there is a low incline 410, suggesting point 401b is associated with a road surface that is traversable. Between points 402a and 402b, however, there is much larger incline 420, suggesting point 402b is associated with an obstacle. Once the model-based probability filter 232 identifies an obstacle, the model-based probability filter 232 may estimate the maximum road surface height based on the height value for the previous measurement point.

With the determined road surface height $h_r$ and a minimum ceiling height $h_e$, the model-based probability filter 232 may determine obstacle probability $P_0$, an example of which is illustrated in the decision tree 300 of FIG. 3. In step 310, all points outside of $[h_r, h_c]$ (i.e., points associated with traversable space) have $P_o=0$. In step 320, all points that have a height that is considered relevant (e.g., h∈ $[h_r, h_e]$) have $P_0=1$. For other points (e.g., ambiguous points), in step 330, the incline is evaluated and if $$\left[\frac{h}{d} \le \alpha\right]$$

then $P_o=1$, otherwise $$P_O = \frac{h - h_r}{h_t + h_r}.$$

Using this type of decision tree 300, the model-based probability filter 232 may generate a high $P_o$ for obstacles and objects that are clearly visible in the sensor measurement data. As should be appreciated, points associated with vehicles may result in a high object probability, whereas points associated with road surfaces, lower parts of the vehicles, and upper parts of the vehicles may result in a smaller object probability.

The model-based probability filter 232 may help the hierarchical monitoring system 200 to not miss clearly visible obstacles. Nevertheless, there may be regions where a decision based on $P_o$ alone may not be sufficient to categorize the object as an obstacle. For example, partially occluded objects, stronger slopes of the road, etc., may benefit from additional layers of processing/filtering (e.g., from any number of filter(s) 232a to 232n). One type of additional filtering may be a trained perception algorithm that uses additional data to help the hierarchical monitoring system 200 come to a better decision on whether a particular measurement point or region is relevant. Of course, trained model-based algorithms (e.g., artificial intelligence models) may bring the risk of misclassification due to incomplete training data and lack of generalization. To counter this potential problem, the hierarchical monitoring system 200 may integrate trained model information so that the model-based algorithm does not jeopardize the safety of the system. The hierarchical monitoring system 200 may use additional filters (e.g., perception algorithms) to accomplish this task. Although two examples are provided below, it should be appreciated that the hierarchical monitoring system 200 may integrate any number of additional filters in addition to, in lieu of, or in combination with those examples discussed below.

An example of an additional filter (e.g., filter 232a of FIG. 2) may include an objectiveness filter. The objectiveness filter may estimate a likelihood ($P_N$) that a given point belongs to an object based on a learning model. The objectiveness filter may include an artificial intelligence (AI) algorithm that has been trained with the particular type of sensor information available for use by the hierarchical monitoring system 200 (e.g., trained on LiDAR information). For example, the objectiveness filter may use a neural network architecture that provides reliable three-dimensional (3D) bounding box detection from point cloud data while maintaining efficient for real-time calculations. The objectiveness filter of conventional neural network architectures may be simplified by exchanging the detection head by a convolutions structure outputting a two dimensional grid (e.g., a 512×512 grid). The objectiveness filter may calculate an objectiveness-based probability ($P_N$) for each point in the grid, where the objectiveness-based probability indicates the likelihood that the trained model determines that the given cell is occupied by an object.

The training model may be trained by a training dataset, and the training model may be validated by a validation data set. For training, the range of the point cloud may be constrained to ±81.92m around the ego vehicle, but of course, any range may be used. The output may be a two-dimensional 512×512 grid, but of course, any grid size may be used. Each cell of the output grid may indicate whether the cell is occupied by an object or unoccupied. The output of the model (e.g., the objectiveness-based probability) may be transformed by a sigmoid activation into the range [0; 1]. The model may be trained in any manner, including, for example Binary Cross Entropy Loss. The objectiveness filter may, for each output cell i, compare the activation ŷ with the ground truth y via equation (3) below. On a subsample, the imbalance of occupied to unoccupied cells may be estimated to be roughly 1:50, which may be included as a positive weighting w=50 in the loss in order to deter the model to only predict background, though the imbalance and weighting may be any values. Ultimately, the loss function may be expressed as:

$$\ell_i(y, \hat{y}) = w \cdot y_i \cdot \log(\hat{y}_i) + (1 - y_i) \cdot \log(1 - \hat{y}_i) \qquad (3)$$

The overall loss for each data point may then be calculated as the mean loss $\ell_i$ of all cells:

$$L = \frac{\sum_k^N \ell_i}{N} \qquad (4)$$

As noted earlier, the objectiveness filter may provide for each cell a probability (e.g., an objectiveness-based probability) that a region around the vehicle is occupied by an obstacle. One the objectiveness filter has calculated the probability for each cell, the probability ($P_N$) that a point in the point cloud belongs to an object, the objectiveness filter may simply use the x- and y-position of the point and retrieve the objectiveness-based probability from the corresponding position in the objectiveness grid.

An example of an additional filter (e.g., filter 232n of FIG. 2) may include a semantic segmentation filter. The semantic segmentation filter may estimate a likelihood ($P_s$) that a given point belongs to an obstacle based on a classification. For example, camera-based or LiDAR-based semantic segmentation may be used according to conventional methods such as with the OpenVINO SDK (e.g., the FastSeg-Large model, built on the MobileNetV3 large backbone with a modified segmentation head, based on LR-ASPP), where sensor data is fed into a semantic segmentation subsystem that associates a classification with each point of data. In image-based semantic segmentation, for example, each pixel of the camera image may be associated with a segmentation class (e.g., vehicle, road, sky, pedestrian, infrastructure, etc.).

Then, the semantic segmentation filter may map the point cloud of sensor data to the semantic segmented image (e.g., a point of the point cloud is mapped to a location corresponding to a pixel of the image) to assign a probability ($P_s$) that a given point belongs to an obstacle based the segmentation classification of its corresponding pixel (i,j) and nearby pixels. An example calculation is shown below, where $1_{(i,j)}$ is one if the class for pixel is considered relevant, otherwise it is zero:

$$P_S(i, j) = 0.5 \times 1_{(i,j)} \quad (4)$$
$$+ 0.1 + [1_{(i-1,j)} + 1_{(i+1,j)} + 1_{(i,j-1)} + 1_{(i,j+1)}]$$
$$+ \frac{1}{40} \times [1_{(i-1,j-1)} + 1_{(i+1,j-1)} + 1_{(i+1,j-1)} + 1_{(i+1,j+1)}]$$

Conventional semantic segmentation systems often provide imprecise classifications at the edges of objects. Thus, the semantic segmentation filter may account for such imprecision, as shown in the exemplary formula above, by taking into account not only the pixel itself (i,j), but also the neighboring pixels, and using weights that may be based on the pixel distance from the pixel to its neighboring pixels.

After the hierarchical monitoring system 200 applies filters (e.g., in FIG. 2, model-based probability filter 232, filter 232a (e.g., the objectiveness filter described above), and filter 232n (e.g., the semantic segmentation filter described above) to the sensor data, the hierarchical monitoring system 200 may fuse the probabilities using a hierarchical combination that may include overlook prevention (e.g., in overlook prevention module 234). For each measurement point (e.g., for each point in the point cloud (e.g., a LiDAR point cloud)), the hierarchical monitoring system 200 may have determined three probabilities: $P_o$, $P_N$, $P_s$. Based on any, some, or all of these probabilities, the hierarchical monitoring system 200 may filter the point cloud using a hierarchical combination for whether one or more probabilities satisfies one or more predetermined criteria, as shown below in equation (5):

$$f(P_O, P_N, P_S) = \begin{cases} 1, \text{ if } P_O > 0.9 \\ 1, \text{ if } P_O > 0.5 \wedge P_S > 0.7 \wedge P_N > 0.2 \\ 1, \text{ if } P_O > 0.5 \wedge P_N > 0.6 \\ 1, \text{ if } P_O > 0.5 \wedge P_S > 0.9 \\ 0, \text{ otherwise} \end{cases} \quad (5)$$

The overlook prevention module 234 may ensure that points in the point cloud with high $P_o$, for example, are not filtered out. An example of this is shown, for example, in equation (5) above, where the first criterion ensures that points with a high $P_o$ (e.g., >0.9) are not filtered out. As also shown in the above example equation, for points with lower $P_o$ values, the hierarchical monitoring system 200 may use a combination of $P_o$ with one or more of the other probability values (e.g., from other filters), each with varying criterion, to increase overall reliability and robustness of the resulting filtered point cloud 236. According to the equation (5) above, for example, f will return 1 for all points i that should remain in the filtered point cloud 236 and return 0 if the point should be removed from the filtered point cloud 236.

While equation (5) has been shown as one example, it should be appreciated that the hierarchical monitoring system 200 may use any of the determined filters, alone or in a hierarchical manner, to arrive at the resulting filtered point cloud 236. As should also be appreciated, while three types of filters have been described (e.g., $P_o$, $P_N$, $P_s$) any type filter may be used that allow the hierarchical monitoring system 200 to assess the space around the vehicle and determine whether the point belongs to an obstacle and should be included in the filtered point cloud 236.

Once the hierarchical monitoring system 200 has generated the filtered point cloud 236, in which each point may have a high confidence as belonging to an obstacle, the hierarchical monitoring system 200 may convert the filtered point cloud 236 into an occupancy grid 238 for correlating this to the occupancy grid that may have been generated by the primary perception system.

Figure 5:
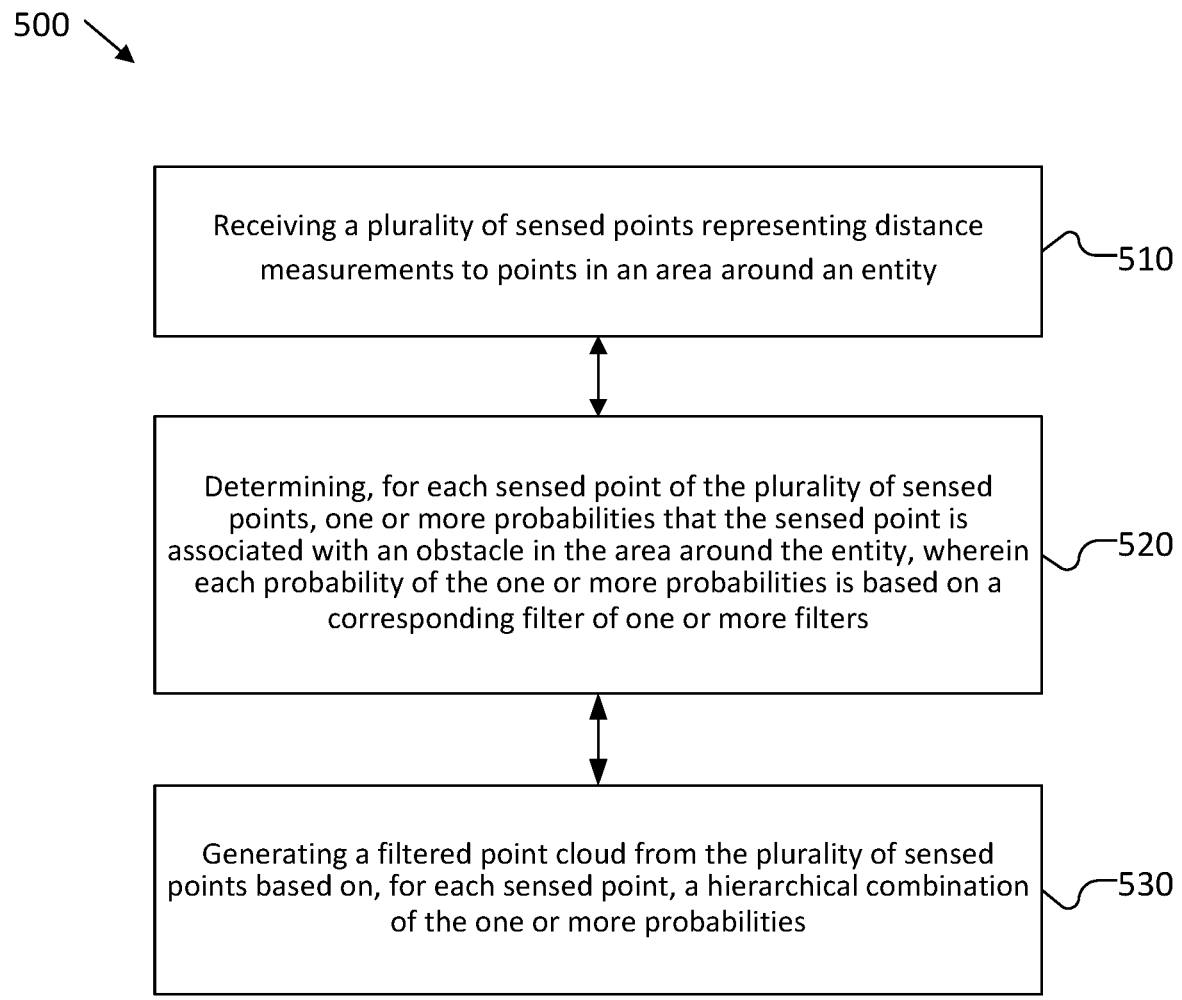
FIG. 5 depicts an exemplary schematic flow diagram of an exemplary method for a hierarchical monitoring system for generating a filtered point cloud.

FIG. 5 depicts a schematic flow diagram of a method 500 for a hierarchical monitoring system for generating a filtered point cloud. Method 500 may implement any of the hierarchical monitoring system features described above with respect to, as an example, the hierarchical monitoring system 200 of FIG. 2 as well as the features described above with respect to FIGS. 1-4.

Method 500 includes, in 510, receiving a plurality of sensed points representing distance measurements to points in an area around an entity. Method 500 also includes, in 520, determining, for each sensed point of the plurality of sensed points, one or more probabilities that the sensed point is associated with an obstacle in the area around the entity, wherein each probability of the one or more probabilities is based on a corresponding filter of one or more filters. Method 500 also includes, in 530, generating a filtered point cloud from the plurality of sensed points based on, for each sensed point, a hierarchical combination of the one or more probabilities.

Figure 6:
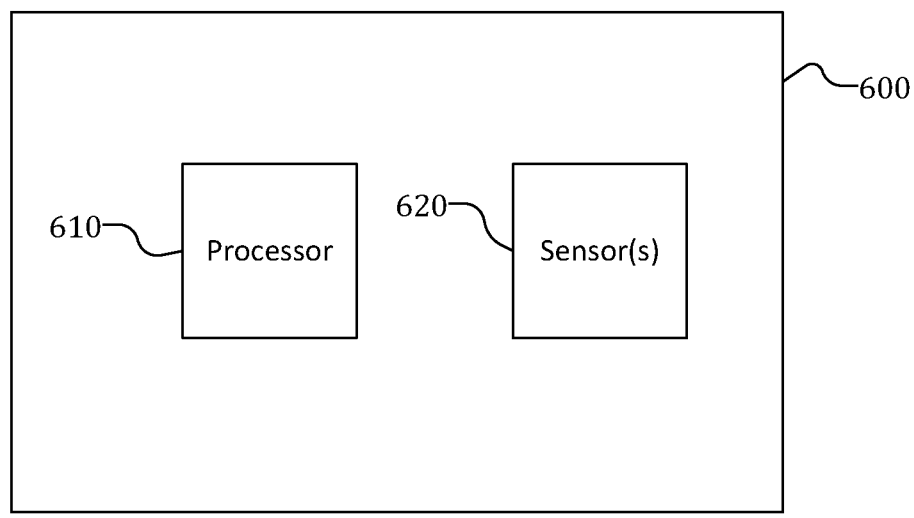
FIG. 6 depicts an exemplary device for a hierarchical monitoring system for generating a filtered point cloud.

FIG. 6 is a schematic drawing illustrating a device 600 for a hierarchical monitoring system for generating a filtered point cloud. Device 600 may implement any of the hierarchical monitoring system features described above with respect to, as an example, the hierarchical monitoring system 200 of FIG. 2 as well as any of the features described above with respect to FIGS. 1-5. FIG. 6 may be implemented as a device, a system, a method, and/or a computer readable medium that, when executed, performs the features of the real-time prediction system described above. It should be understood that device 600 is only an example, and other configurations may be possible that include, for example, different components or additional components.

Device 600 includes a processor 610. In addition to or in combination with any of the features described in this or the following paragraphs, processor 610 is configured to receive a plurality of sensed points representing distance measurements to points in an area around an entity. In addition to or in combination with any of the features described in this or the following paragraphs, processor 610 is further configured to determine, for each sensed point of the plurality of sensed points, one or more probabilities that the sensed point is associated with an obstacle in the area around the entity, wherein each probability of the one or more probabilities is based on a corresponding filter of one or more filters. In addition to or in combination with any of the features described in this or the following paragraphs, processor 610 is further configured to generate a filtered point cloud from the plurality of sensed points based on, for each sensed point, a hierarchical combination of the one or more probabilities.

Furthermore, in addition to or in combination with any one of the features of this and/or the preceding paragraph, processor 610 may be further configured to create an occupancy grid based on the filtered point cloud, wherein the occupancy grid is indicative of detected objects occupying the area around the entity. Furthermore, in addition to or in combination with any one of the features of this and/or the preceding paragraph, the processor 610 configured to generate the filtered point cloud from the plurality of sensed points may include the processor configured to include the sensed point in the filtered point cloud if the hierarchical combination of the one or more probabilities satisfies one or more predetermined criteria. Furthermore, in addition to or in combination with any one of the features of this and/or the preceding paragraph, the one or more predetermined criteria may include an overlook prevention criterion. Furthermore, in addition to or in combination with any one of the features of this and/or the preceding paragraph, the overlook prevention criterion may include processor 610 configured to include the sensed point in the filtered point cloud if at least one probability of the one or more of the probabilities meets a minimum overlook prevention threshold associated with the probability.

Furthermore, in addition to or in combination with any one of the features of this and/or the preceding two paragraphs, processor 610 may be configured to determine for the sensed point, if the probability associated with the corresponding filter is within a predefined ambiguous range, another probability associated with another filter of the one or more filters. Furthermore, in addition to or in combination with any one of the features of this and/or the preceding two paragraphs, the obstacle may include a safety-relevant object that represents a safety risk to the entity. Furthermore, in addition to or in combination with any one of the features of this and/or the preceding two paragraphs, the entity may include a vehicle. Furthermore, in addition to or in combination with any one of the features of this and/or the preceding two paragraphs, the entity may include an autonomous or partially autonomous vehicle. Furthermore, in addition to or in combination with any one of the features of this and/or the preceding two paragraphs, the plurality of sensed points representing distance measurements may include a point cloud of the area around the entity.

Furthermore, in addition to or in combination with any one of the features of this and/or the preceding three paragraphs, processor 610 may be configured to receive the plurality of sensed points representing distance measurements from a sensor 620. Furthermore, in addition to or in combination with any one of the features of this and/or the preceding three paragraphs, sensor 620 may include at least one of a LiDAR sensor, a stereo-camera sensor, a depth image sensor, an infrared sensor, and a radar sensor. Furthermore, in addition to or in combination with any one of the features of this and/or the preceding three paragraphs, at least one of the one or more filters may include a model-based filter, wherein the probability for the model-based filter for each sensed point is based on height information and/or depth information associated with the sensed point. Furthermore, in addition to or in combination with any one of the features of this and/or the preceding three paragraphs, the height information and/or depth information may include an incline value associated with each sensed point of the plurality of sensed points, wherein the incline value is indicative of a difference between a height of the sensed point relative to a height of an adjacent point of the plurality of sensed points. Furthermore, in addition to or in combination with any one of the features of this and/or the preceding three paragraphs, the probability for the model-based filter may include a fractional value between zero and one, wherein processor 610 configured to generate the probability for the model-based filter may include processor 610 configured to set the probability for the model-based filter to zero if a height of the sensed point is outside a predetermined height range. Furthermore, in addition to or in combination with any one of the features of this and/or the preceding three paragraphs, the processor 610 configured to generate the probability for the model-based filter may include processor 610 configured to set the probability for the model-based filter to one if the height of the sensed point is within the predetermined height range and below a predetermined height threshold within the predetermined height range. Furthermore, in addition to or in combination with any one of the features of this and/or the preceding three paragraphs, the processor 610 configured to generate the probability for the model-based filter may include processor 610 configured to set the probability for the model-based filter to a height difference between the height of the sensed point and a road surface height, divided by a sum of the predetermined height threshold and the road surface height. Furthermore, in addition to or in combination with any one of the features of this and/or the preceding three paragraphs, the processor 610 configured to generate the probability for the model-based filter may include processor 610 configured to set the probability for the model-based filter to zero if the height of the sensed point divided by a distance to the sensed point is less than or equal to a predetermined incline threshold.

Furthermore, in addition to or in combination with any one of the features of this and/or the preceding four paragraphs, at least one of the one or more filters may include an objectiveness filter, wherein the probability for the objectiveness filter for each sensed point is based on a learning model of historical measurement data. Furthermore, in addition to or in combination with any one of the features of this and/or the preceding four paragraphs, processor 610 may be further configured to generate the probability for the objectiveness filter based on comparisons of the historical measurement data to measurement data associated with the sensed point. Furthermore, in addition to or in combination with any one of the features of this and/or the preceding four paragraphs, at least one of the one or more filters may include a semantic segmentation filter, wherein the probability for the semantic segmentation filter for each sensed point is based on an object classification associated with a pixel location of the sensed point on a segmented image. Furthermore, in addition to or in combination with any one of the features of this and/or the preceding four paragraphs, the probability for the semantic segmentation filter for each sensed point may be further based on a neighbouring object classification associated with a neighbouring pixel to the pixel location on the segmented image. Furthermore, in addition to or in combination with any one of the features of this and/or the preceding four paragraphs, the one or more filters may include a model-based filter, an objectiveness filter, and/or a semantic segmentation filter, wherein the processor 610 configured to determine if the hierarchical combination of the one or more probabilities satisfies one or more predetermined criteria may include processor 610 configured to determine if the probability for the model-based filter is above a predetermined model-based probability threshold and/or the probability for the objectiveness filter is above a predetermined objectiveness probability threshold and/or the probability for the semantic segmentation filter is above a predetermined semantic segmentation probability threshold.

In the following, various examples are provided that may include one or more aspects described above with reference to the hierarchical monitoring system 200, method 500, device 600, and any of FIGS. 1-6. The examples provided in relation to the devices may apply also to the described method(s), and vice versa.

Example 1 is a device including a processor configured to receive a plurality of sensed points representing distance measurements to points in an area around an entity. The processor is also configured to determine, for each sensed point of the plurality of sensed points, one or more probabilities that the sensed point is associated with an obstacle in the area around the entity, wherein each probability of the one or more probabilities is based on a corresponding filter of one or more filters. The processor is also configured to generate a filtered point cloud from the plurality of sensed points based on, for each sensed point, a hierarchical combination of the one or more probabilities.

Example 2 is the device of example 1, wherein the processor is further configured to create an occupancy grid based on the filtered point cloud, wherein the occupancy grid is indicative of detected objects occupying the area around the entity.

Example 3 is the device of either of examples 1 or 2, wherein the processor configured to generate the filtered point cloud from the plurality of sensed points includes the processor configured to include the sensed point in the filtered point cloud if the hierarchical combination of the one or more probabilities satisfies one or more predetermined criteria.

Example 4 is the device of example 3, wherein the one or more predetermined criteria includes an overlook prevention criterion.

Example 5 is the device of example 4, wherein the overlook prevention criterion includes the processor configured to include the sensed point in the filtered point cloud if at least one probability of the one or more of the probabilities meets a minimum overlook prevention threshold associated with the probability.

Example 6 is the device of any one of examples 1 to 5, wherein the processor is configured to determine, if the probability associated with the corresponding filter is within a predefined ambiguous range, determine for the sensed point another probability associated with another filter of the one or more filters.

Example 7 is the device of any one of examples 1 to 6, wherein the obstacle includes a safety-relevant object that represents a safety risk to the entity.

Example 8 is the device of any one of examples 1 to 7, wherein the entity includes a vehicle.

Example 9 is the device of any one of examples 1 to 8, wherein the entity includes an autonomous or partially autonomous vehicle.

Example 10 is the device of any one of examples 1 to 9, wherein the plurality of sensed points representing distance measurements includes a point cloud of the area around the entity.

Example 11 is the device of any one of examples 1 to 10, wherein the processor is configured to receive the plurality of sensed points representing distance measurements from a sensor.

Example 12 is the device of example 11, wherein the sensor includes at least one of a LiDAR sensor, a stereo-camera sensor, a depth image sensor, an infrared sensor, and a radar sensor.

Example 13 is the device of any one of examples 1 to 12, wherein at least one of the one or more filters includes a model-based filter, wherein the probability for the model-based filter for each sensed point is based on height information and/or depth information associated with the sensed point.

Example 14 is the device of example 13, wherein the height information and/or depth information includes an incline value associated with each sensed point of the plurality of sensed points, wherein the incline value is indicative of a difference between a height of the sensed point relative to a height of an adjacent point of the plurality of sensed points.

Example 15 is the device of either of examples 13 or 14, wherein the probability for the model-based filter includes a fractional value between zero and one, wherein the processor configured to generate the probability for the model-based filter includes the processor configured to set the probability for the model-based filter to zero if a height of the sensed point is outside a predetermined height range.

Example 16 is the device of example 15, wherein the processor configured to generate the probability for the model-based filter includes the processor configured to set the probability for the model-based filter to one if the height of the sensed point is within the predetermined height range and below a predetermined height threshold within the predetermined height range.

Example 17 is the device of example 16, wherein the processor configured to generate the probability for the model-based filter includes the processor configured to set the probability for the model-based filter to a height difference between the height of the sensed point and a road surface height, divided by a sum of the predetermined height threshold and the road surface height.

Example 18 is the device of any one of examples 15 to 17, wherein the processor configured to generate the probability for the model-based filter includes the processor configured to set the probability for the model-based filter to zero if the height of the sensed point divided by a distance to the sensed point is less than or equal to a predetermined incline threshold.

Example 19 is the device of any one of examples 1 to 18, wherein at least one of the one or more filters includes an objectiveness filter, wherein the probability for the objectiveness filter for each sensed point is based on a learning model of historical measurement data.

Example 20 is the device of example 19, wherein the processor is further configured to generate the probability for the objectiveness filter based on comparisons of the historical measurement data to measurement data associated with the sensed point.

Example 21 is the device of any one of examples 1 to 20, wherein at least one of the one or more filters includes a semantic segmentation filter, wherein the probability for the semantic segmentation filter for each sensed point is based on an object classification associated with a pixel location of the sensed point on a segmented image.

Example 22 is the device of example 21, wherein the probability for the semantic segmentation filter for each sensed point is further based on a neighbouring object classification associated with a neighbouring pixel to the pixel location on the segmented image.

Example 23 is the device of any one of examples 3 to 22, wherein the one or more filters include a model-based filter, an objectiveness filter, and/or a semantic segmentation filter, wherein the processor configured to determine if the hierarchical combination of the one or more probabilities satisfies one or more predetermined criteria includes the processor configured to determine if the probability for the model-based filter is above a predetermined model-based probability threshold and/or the probability for the objectiveness filter is above a predetermined objectiveness probability threshold and/or the probability for the semantic segmentation filter is above a predetermined semantic segmentation probability threshold.

Example 24 is a method that includes receiving a plurality of sensed points representing distance measurements to points in an area around an entity. The method also includes determining, for each sensed point of the plurality of sensed points, one or more probabilities that the sensed point is associated with an obstacle in the area around the entity, wherein each probability of the one or more probabilities is based on a corresponding filter of one or more filters. The method also includes generating a filtered point cloud from the plurality of sensed points based on, for each sensed point, a hierarchical combination of the one or more probabilities.

Example 25 is the method of example 24, wherein the method further includes creating an occupancy grid based on the filtered point cloud, wherein the occupancy grid is indicative of detected objects occupying the area around the entity.

Example 26 is the method of either of examples 24 or 25, wherein generating the filtered point cloud from the plurality of sensed points includes including the sensed point in the filtered point cloud if the hierarchical combination of the one or more probabilities satisfies one or more predetermined criteria.

Example 27 is the method of example 26, wherein the one or more predetermined criteria includes an overlook prevention criterion.

Example 28 is the method of example 27, wherein the overlook prevention criterion includes the processor configured to include the sensed point in the filtered point cloud if at least one probability of the one or more of the probabilities meets a minimum overlook prevention threshold associated with the probability.

Example 29 is the method of any one of examples 24 to 28, determining for the sensed point, if the probability associated with the corresponding filter is within a predefined ambiguous range, another probability associated with another filter of the one or more filters.

Example 30 is the method of any one of examples 24 to 29, wherein the obstacle includes a safety-relevant object that represents a safety risk to the entity.

Example 31 is the method of any one of examples 24 to 30, wherein the entity includes a vehicle.

Example 32 is the method of any one of examples 24 to 31, wherein the entity includes an autonomous or partially autonomous vehicle.

Example 33 is the method of any one of examples 24 to 32, wherein the plurality of sensed points representing distance measurements includes a point cloud of the area around the entity.

Example 34 is the method of any one of examples 24 to 33, the method further including receiving the plurality of sensed points representing distance measurements from a sensor.

Example 35 is the method of example 34, wherein the sensor includes at least one of a LiDAR sensor, a stereo-camera sensor, a depth image sensor, an infrared sensor, and a radar sensor.

Example 36 is the method of any one of examples 24 to 35, wherein at least one of the one or more filters includes a model-based filter, wherein the probability for the model-based filter for each sensed point is based on height information and/or depth information associated with the sensed point.

Example 37 is the method of example 36, wherein the height information and/or depth information includes an incline value associated with each sensed point of the plurality of sensed points, wherein the incline value is indicative of a difference between a height of the sensed point relative to a height of an adjacent point of the plurality of sensed points.

Example 38 is the method of either of examples 36 or 37, wherein the probability for the model-based filter includes a fractional value between zero and one, wherein generating the probability for the model-based filter includes setting the probability for the model-based filter to zero if a height of the sensed point is outside a predetermined height range.

Example 39 is the method of example 38, wherein generating the probability for the model-based filter includes setting the probability for the model-based filter to one if the height of the sensed point is within the predetermined height range and below a predetermined height threshold within the predetermined height range.

Example 40 is the method of example 39, wherein generating the probability for the model-based filter includes setting the probability for the model-based filter to a height difference between the height of the sensed point and a road surface height, divided by a sum of the predetermined height threshold and the road surface height.

Example 41 is the method of any one of examples 38 to 40, wherein generating the probability for the model-based filter includes setting the probability for the model-based filter to zero if the height of the sensed point divided by a distance to the sensed point is less than or equal to a predetermined incline threshold.

Example 42 is the method of any one of examples 24 to 41, wherein at least one of the one or more filters includes an objectiveness filter, wherein the probability for the objectiveness filter for each sensed point is based on a learning model of historical measurement data.

Example 43 is the method of example 42, wherein the method further includes generating the probability for the objectiveness filter based on comparisons of the historical measurement data to measurement data associated with the sensed point.

Example 44 is the method of any one of examples 24 to 43, wherein at least one of the one or more filters includes a semantic segmentation filter, wherein the probability for the semantic segmentation filter for each sensed point is based on an object classification associated with a pixel location of the sensed point on a segmented image.

Example 45 is the method of example 44, wherein the probability for the semantic segmentation filter for each sensed point is further based on a neighbouring object classification associated with a neighbouring pixel to the pixel location on the segmented image.

Example 46 is the method of any one of examples 26 to 45, wherein the one or more filters include a model-based filter, an objectiveness filter, and/or a semantic segmentation filter, wherein determining if the hierarchical combination of the one or more probabilities satisfies one or more predetermined criteria includes determining if the probability for the model-based filter is above a predetermined model-based probability threshold and/or the probability for the objectiveness filter is above a predetermined objectiveness probability threshold and/or the probability for the semantic segmentation filter is above a predetermined semantic segmentation probability threshold.

Example 47 is a non-transitory computer readable medium, including instructions which, if executed, cause one or more processors to receive a plurality of sensed points representing distance measurements to points in an area around an entity. The instructions are also configured to cause the one or more processors to determine, for each sensed point of the plurality of sensed points, one or more probabilities that the sensed point is associated with an obstacle in the area around the entity, wherein each probability of the one or more probabilities is based on a corresponding filter of one or more filters. The instructions are also configured to cause the one or more processors to generate a filtered point cloud from the plurality of sensed points based on, for each sensed point, a hierarchical combination of the one or more probabilities.

Example 48 is the non-transitory computer readable medium of example 47, wherein the instructions are further configured to cause the one or more processors to create an occupancy grid based on the filtered point cloud, wherein the occupancy grid is indicative of detected objects occupying the area around the entity.

Example 49 is the non-transitory computer readable medium of either of examples 47 or 48, wherein the instructions that are configured to cause the one or more processors to generate the filtered point cloud from the plurality of sensed points includes the instructions configured to cause the one or more processors to include the sensed point in the filtered point cloud if the hierarchical combination of the one or more probabilities satisfies one or more predetermined criteria.

Example 50 is the non-transitory computer readable medium of example 49, wherein the one or more predetermined criteria includes an overlook prevention criterion.

Example 51 is the non-transitory computer readable medium of example 50, wherein the overlook prevention criterion includes the instructions configured to cause the one or more processors to include the sensed point in the filtered point cloud if at least one probability of the one or more of the probabilities meets a minimum overlook prevention threshold associated with the probability.

Example 52 is the non-transitory computer readable medium of any one of examples 47 to 51, wherein the instructions are further configured to cause the one or more processors to determine for the sensed point, if the probability associated with the corresponding filter is within a predefined ambiguous range, another probability associated with another filter of the one or more filters.

Example 53 is the non-transitory computer readable medium of any one of examples 47 to 52, wherein the obstacle includes a safety-relevant object that represents a safety risk to the entity.

Example 54 is the non-transitory computer readable medium of any one of examples 47 to 53, wherein the entity includes a vehicle.

Example 55 is the non-transitory computer readable medium of any one of examples 47 to 54, wherein the entity includes an autonomous or partially autonomous vehicle.

Example 56 is the non-transitory computer readable medium of any one of examples 47 to 55, wherein the plurality of sensed points representing distance measurements includes a point cloud of the area around the entity.

Example 57 is the non-transitory computer readable medium of any one of examples 47 to 56, wherein the instructions are further configured to cause the one or more processors to receive the plurality of sensed points representing distance measurements from a sensor.

Example 58 is the non-transitory computer readable medium of example 57, wherein the sensor includes at least one of a LiDAR sensor, a stereo-camera sensor, a depth image sensor, an infrared sensor, and a radar sensor.

Example 59 is the non-transitory computer readable medium of any one of examples 47 to 58, wherein at least one of the one or more filters includes a model-based filter, wherein the probability for the model-based filter for each sensed point is based on height information and/or depth information associated with the sensed point.

Example 60 is the non-transitory computer readable medium of example 59, wherein the height information and/or depth information includes an incline value associated with each sensed point of the plurality of sensed points, wherein the incline value is indicative of a difference between a height of the sensed point relative to a height of an adjacent point of the plurality of sensed points.

Example 61 is the non-transitory computer readable medium of either of examples 59 or 60, wherein the probability for the model-based filter includes a fractional value between zero and one, wherein the instructions that are configured to cause the one or more processors to generate the probability for the model-based filter includes the instructions configured to cause the one or more processors to set the probability for the model-based filter to zero if a height of the sensed point is outside a predetermined height range.

Example 62 is the non-transitory computer readable medium of example 61, wherein the instructions that are configured to cause the one or more processors to generate the probability for the model-based filter includes the instructions configured to cause the one or more processors to set the probability for the model-based filter to one if the height of the sensed point is within the predetermined height range and below a predetermined height threshold within the predetermined height range.

Example 63 is the non-transitory computer readable medium of example 62, wherein the instructions that are configured to cause the one or more processors to generate the probability for the model-based filter includes the instructions configured to cause the one or more processors to set the probability for the model-based filter to a height difference between the height of the sensed point and a road surface height, divided by a sum of the predetermined height threshold and the road surface height.

Example 64 is the non-transitory computer readable medium of any one of examples 61 to 63, wherein the instructions that are configured to cause the one or more processors to generate the probability for the model-based filter includes the instructions configured to cause the one or more processors to set the probability for the model-based filter to zero if the height of the sensed point divided by a distance to the sensed point is less than or equal to a predetermined incline threshold.

Example 65 is the non-transitory computer readable medium of any one of examples 47 to 64, wherein at least one of the one or more filters includes an objectiveness filter, wherein the probability for the objectiveness filter for each sensed point is based on a learning model of historical measurement data.

Example 66 is the non-transitory computer readable medium of example 65, wherein the instructions a further configured to cause the one or more processors to generate the probability for the objectiveness filter based on comparisons of the historical measurement data to measurement data associated with the sensed point.

Example 67 is the non-transitory computer readable medium of any one of examples 47 to 66, wherein at least one of the one or more filters includes a semantic segmentation filter, wherein the probability for the semantic segmentation filter for each sensed point is based on an object classification associated with a pixel location of the sensed point on a segmented image.

Example 68 is the non-transitory computer readable medium of example 67, wherein the probability for the semantic segmentation filter for each sensed point is further based on a neighbouring object classification associated with a neighbouring pixel to the pixel location on the segmented image.

Example 69 is the non-transitory computer readable medium of any one of examples 49 to 68, wherein the one or more filters include a model-based filter, an objectiveness filter, and/or a semantic segmentation filter, wherein the instructions that are configured to cause the one or more processors to determine if the hierarchical combination of the one or more probabilities satisfies one or more predetermined criteria includes the instructions configured to cause the one or more processors to determine if the probability for the model-based filter is above a predetermined model-based probability threshold and/or the probability for the objectiveness filter is above a predetermined objectiveness probability threshold and/or the probability for the semantic segmentation filter is above a predetermined semantic segmentation probability threshold.

Example 70 is an apparatus that includes a means for receiving a plurality of sensed points representing distance measurements to points in an area around an entity. The apparatus also includes a means for determining, for each sensed point of the plurality of sensed points, one or more probabilities that the sensed point is associated with an obstacle in the area around the entity, wherein each probability of the one or more probabilities is based on a corresponding filter of one or more filters. The apparatus also includes a means for generating a filtered point cloud from the plurality of sensed points based on, for each sensed point, a hierarchical combination of the one or more probabilities.

Example 71 is the apparatus of example 70, wherein the apparatus further includes a means for creating an occupancy grid based on the filtered point cloud, wherein the occupancy grid is indicative of detected objects occupying the area around the entity.

Example 72 is the apparatus of either of examples 70 or 71, wherein the means for generating the filtered point cloud from the plurality of sensed points includes a means for including the sensed point in the filtered point cloud if the hierarchical combination of the one or more probabilities satisfies one or more predetermined criteria.

Example 73 is the apparatus of example 72, wherein the one or more predetermined criteria includes an overlook prevention criterion.

Example 74 is the apparatus of example 73, wherein the overlook prevention criterion includes a means for including the sensed point in the filtered point cloud if at least one probability of the one or more of the probabilities meets a minimum overlook prevention threshold associated with the probability.

Example 75 is the apparatus of any one of examples 70 to 74, determining for the sensed point, if the probability associated with the corresponding filter is within a predefined ambiguous range, another probability associated with another filter of the one or more filters.

Example 76 is the apparatus of any one of examples 70 to 75, wherein the obstacle includes a safety-relevant object that represents a safety risk to the entity.

Example 77 is the apparatus of any one of examples 70 to 76, wherein the entity includes a vehicle.

Example 78 is the apparatus of any one of examples 70 to 77, wherein the entity includes an autonomous or partially autonomous vehicle.

Example 79 is the apparatus of any one of examples 70 to 78, wherein the plurality of sensed points representing distance measurements includes a point cloud of the area around the entity.

Example 80 is the apparatus of any one of examples 70 to 79, the apparatus further including a means for receiving the plurality of sensed points representing distance measurements from a sensing means.

Example 81 is the apparatus of example 80, wherein the sensing means includes at least one of a LiDAR sensor, a stereo-camera sensor, a depth image sensor, an infrared sensor, and a radar sensor.

Example 82 is the apparatus of any one of examples 70 to 81, wherein at least one of the one or more filters includes a model-based filter, wherein the probability for the model-based filter for each sensed point is based on height information and/or depth information associated with the sensed point.

Example 83 is the apparatus of example 82, wherein the height information and/or depth information includes an incline value associated with each sensed point of the plurality of sensed points, wherein the incline value is indicative of a difference between a height of the sensed point relative to a height of an adjacent point of the plurality of sensed points.

Example 84 is the apparatus of either of examples 82 or 83, wherein the probability for the model-based filter includes a fractional value between zero and one, wherein the mans for generating the probability for the model-based filter includes a means for setting the probability for the model-based filter to zero if a height of the sensed point is outside a predetermined height range.

Example 85 is the apparatus of example 84, wherein the means for generating the probability for the model-based filter includes a means for setting the probability for the model-based filter to one if the height of the sensed point is within the predetermined height range and below a predetermined height threshold within the predetermined height range.

Example 86 is the apparatus of example 85, wherein generating the probability for the model-based filter includes a means for setting the probability for the model-based filter to a height difference between the height of the sensed point and a road surface height, divided by a sum of the predetermined height threshold and the road surface height.

Example 87 is the apparatus of any one of examples 84 to 86, wherein generating the probability for the model-based filter includes a means for setting the probability for the model-based filter to zero if the height of the sensed point divided by a distance to the sensed point is less than or equal to a predetermined incline threshold.

Example 88 is the apparatus of any one of examples 70 to 87, wherein at least one of the one or more filters includes an objectiveness filter, wherein the probability for the objectiveness filter for each sensed point is based on a learning model of historical measurement data.

Example 89 is the apparatus of example 88, wherein the means for generating the probability for the objectiveness filter includes a means basing the probability for the objectiveness filter on comparisons of the historical measurement data to measurement data associated with the sensed point.

Example 90 is the apparatus of any one of examples 70 to 89, wherein at least one of the one or more filters includes a semantic segmentation filter, wherein the probability for the semantic segmentation filter for each sensed point is based on an object classification associated with a pixel location of the sensed point on a segmented image.

Example 91 is the apparatus of example 90, wherein the probability for the semantic segmentation filter for each sensed point is further based on a neighbouring object classification associated with a neighbouring pixel to the pixel location on the segmented image.

Example 92 is the apparatus of any one of examples 72 to 91, wherein the one or more filters include a model-based filter, an objectiveness filter, and/or a semantic segmentation filter, wherein the means for determining if the hierarchical combination of the one or more probabilities satisfies one or more predetermined criteria includes a means for determining if the probability for the model-based filter is above a predetermined model-based probability threshold and/or the probability for the objectiveness filter is above a predetermined objectiveness probability threshold and/or the probability for the semantic segmentation filter is above a predetermined semantic segmentation probability threshold.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising a processor configured to:
receive from a sensor a plurality of sensed points representing distance measurements to points in an area around a vehicle, wherein the sensor comprises at least one of a LiDAR sensor, a stereo-camera sensor, a depth image sensor, an infrared sensor, and a radar sensor;
determine, for each sensed point of the plurality of sensed points, one or more probabilities that the sensed point is associated with an obstacle in the area around the vehicle, wherein each probability of the one or more probabilities is based on a corresponding filter of one or more filters;
generate a filtered point cloud from the plurality of sensed points based on, for each sensed point, a hierarchical combination of the one or more probabilities; and
control a safety operation of the vehicle based on the filtered point cloud.

2. The device of claim 1, wherein at least one of the one or more filters comprises a model-based filter, wherein the probability for the model-based filter for each sensed point is based on height information and/or depth information associated with the sensed point.

3. The device of claim 2, wherein the height information and/or depth information comprises an incline value associated with each sensed point of the plurality of sensed points, wherein the incline value is indicative of a difference between a height of the sensed point relative to a height of an adjacent point of the plurality of sensed points.

4. The device of claim 2, wherein the probability for the model-based filter comprises a fractional value between zero and one, wherein the processor configured to generate the probability for the model-based filter comprises the processor configured to set the probability for the model-based filter to zero if a height of the sensed point is outside a predetermined height range.

5. The device of claim 4, wherein the processor configured to generate the probability for the model-based filter comprises the processor configured to set the probability for the model-based filter to one if the height of the sensed point is within the predetermined height range and below a predetermined height threshold within the predetermined height range.

6. The device of claim 5, wherein the processor configured to generate the probability for the model-based filter comprises the processor configured to set the probability for the model-based filter to a height difference between the height of the sensed point and a road surface height, divided by a sum of the predetermined height threshold and the road surface height.

7. The device of claim 4, wherein the processor configured to generate the probability for the model-based filter comprises the processor configured to set the probability for the model-based filter to zero if the height of the sensed point divided by a distance to the sensed point is less than or equal to a predetermined incline threshold.

8. The device of claim 1, wherein the processor configured to generate the filtered point cloud from the plurality of sensed points comprises the processor configured to include the sensed point in the filtered point cloud if the hierarchical combination of the one or more probabilities satisfies one or more predetermined criteria.

9. The device of claim 8, wherein the one or more predetermined criteria comprises an overlook prevention criterion.

10. The device of claim 9, wherein the overlook prevention criterion comprises the processor configured to include the sensed point in the filtered point cloud if at least one probability of the one or more of the probabilities meets a minimum overlook prevention threshold associated with the probability.

11. The device of claim 8, wherein the one or more filters comprise a model-based filter, an objectiveness filter, and/or a semantic segmentation filter, wherein the processor configured to determine if the hierarchical combination of the one or more probabilities satisfies one or more predetermined criteria comprises the processor configured to determine if the probability for the model-based filter is above a predetermined model-based probability threshold and/or the probability for the objectiveness filter is above a predetermined objectiveness probability threshold and/or the probability for the semantic segmentation filter is above a predetermined semantic segmentation probability threshold.

12. The device of claim 1, wherein at least one of the one or more filters comprises an objectiveness filter, wherein the probability for the objectiveness filter for each sensed point is based on a learning model of historical measurement data.

13. The device of claim 12, wherein the processor is configured to generate the probability for the objectiveness filter based on comparisons of the historical measurement data to measurement data associated with the sensed point.

14. The device of claim 1, wherein the processor is further configured to create an occupancy grid based on the filtered point cloud, wherein the occupancy grid is indicative of detected objects occupying the area around the vehicle.

15. The device of claim 1, wherein the processor is configured to, if the probability associated with the corresponding filter is within a predefined range, determine for the sensed point another probability associated with another filter of the one or more filters.

16. A non-transitory computer readable medium comprising instructions which, if executed, cause one or more processors to:
receive a plurality of sensed points representing distance measurements to points in an area around an vehicle;
determine, for each sensed point of the plurality of sensed points, one or more probabilities that the sensed point is associated with an obstacle in the area around the vehicle, wherein each probability of the one or more probabilities is based on a corresponding filter of one or more filters, wherein at least one of the one or more filters comprises an objectiveness filter, wherein the probability for the objectiveness filter for each sensed point is based on a learning model of historical measurement data;
generate a filtered point cloud from the plurality of sensed points based on, for each sensed point, a hierarchical combination of the one or more probabilities; and
control a safety operation of the vehicle based on the filtered point cloud.

17. The non-transitory computer readable medium of claim 16, wherein at least one of the one or more filters comprises a semantic segmentation filter, wherein the probability for the semantic segmentation filter for each sensed point is based on an object classification associated with a pixel location of the sensed point on a segmented image.

18. The non-transitory computer readable medium of claim 17, wherein the probability for the semantic segmentation filter for each sensed point is further based on a neighbouring object classification associated with a neighbouring pixel to the pixel location on the segmented image.

19. The non-transitory computer readable medium of claim 16, wherein the obstacle comprises a safety-relevant object that represents a safety risk to the vehicle.

* * * * *